United States Patent
Bertolissio et al.

(10) Patent No.: US 10,527,360 B2
(45) Date of Patent: Jan. 7, 2020

(54) PROCESS FOR UNIFORMIZING THE TEMPERATURE OF A LIQUID

(71) Applicant: Danieli & C. Officine Meccaniche S.P.A., Buttrio (IT)

(72) Inventors: Arrigo Bertolissio, Udine (IT); Francesco Magris, Montereale Valcellina (IT)

(73) Assignee: Danieli & C. Officine Meccaniche S.P.A., Buttrio (IT)

( * ) Notice: Subject to any disclaimer, the term of this patent is extended or adjusted under 35 U.S.C. 154(b) by 228 days.

(21) Appl. No.: 15/579,129

(22) PCT Filed: Jun. 1, 2016

(86) PCT No.: PCT/IB2016/053205
§ 371 (c)(1),
(2) Date: Dec. 1, 2017

(87) PCT Pub. No.: WO2016/193914
PCT Pub. Date: Dec. 8, 2016

(65) Prior Publication Data
US 2018/0164044 A1    Jun. 14, 2018

(30) Foreign Application Priority Data
Jun. 3, 2015   (IT) .................. 102015000020004

(51) Int. Cl.
*F28D 21/00* (2006.01)
*F28F 9/02* (2006.01)
(Continued)

(52) U.S. Cl.
CPC ............. *F28D 21/001* (2013.01); *F15D 1/02* (2013.01); *F24D 11/005* (2013.01);
(Continued)

(58) Field of Classification Search
None
See application file for complete search history.

(56) References Cited

U.S. PATENT DOCUMENTS 2,611,341 A * 9/1952 Paris .................... A01K 13/001
                                                    119/675
3,105,137 A * 9/1963 Sullivan .................... F24D 3/02
                                                    392/341
(Continued)

FOREIGN PATENT DOCUMENTS

DE    1124060    2/1962
EP    2333429    6/2011
(Continued)

Primary Examiner — Thor S Campbell
(74) Attorney, Agent, or Firm — Stetina Brunda Garred & Brocker (57) ABSTRACT

Process for uniformizing the temperature of a liquid coming from a conduit with a constant total flow rate (Qtot), said temperature having a periodic trend in time defined by a first waveform, in which a tank (100) is provided, defining a longitudinal axis, having a lower zone (11) and an upper zone (12), and provided with at least two inlets arranged in a succession between the lower zone (11) and the upper zone (12), with a first inlet (1) proximal to the upper zone (12) and an n-th inlet (n) proximal to the lower zone (11), and provided with at least one outlet (9) arranged between the first inlet (1) and the upper zone (12), and wherein each inlet is arranged at a predetermined distance from the next one along said longitudinal axis.

7 Claims, 7 Drawing Sheets

(51) Int. Cl.

| | | |
|---|---|---|
| *F27D 17/00* | (2006.01) | |
| *F28F 27/02* | (2006.01) | |
| *F28D 20/00* | (2006.01) | |
| *F24D 11/00* | (2006.01) | |
| *G05D 23/13* | (2006.01) | |
| *F15D 1/02* | (2006.01) | |

(52) U.S. Cl.
CPC ....... *F27D 17/004* (2013.01); *F28D 20/0034* (2013.01); *F28F 9/0275* (2013.01); *F28F 27/02* (2013.01); *G05D 23/1393* (2013.01); *F24D 2200/16* (2013.01); *F28F 2250/06* (2013.01)

(56) References Cited

U.S. PATENT DOCUMENTS

| | | | | | |
|---|---|---|---|---|---|
| 3,239,998 | A | * | 3/1966 | Carter | B01D 19/0078 96/175 |
| 4,216,903 | A | * | 8/1980 | Giuffre | F24D 11/0235 237/8 R |
| 4,314,601 | A | * | 2/1982 | Giuffre | F24D 11/0242 165/274 |
| 4,409,958 | A | * | 10/1983 | Fillios | F24D 19/1051 122/14.1 |
| 4,412,526 | A | * | 11/1983 | DeGrose | F24D 3/08 122/14.1 |
| 4,617,910 | A | * | 10/1986 | Fardeau | F24H 1/186 126/373.1 |
| 2009/0078218 | A1 | * | 3/2009 | Gordon | F24D 19/1051 122/13.3 |
| 2010/0195991 | A1 | * | 8/2010 | Deivasigamani | F24D 17/0026 392/308 |
| 2011/0178254 | A1 | * | 7/2011 | Matsuba | B01F 5/10 526/64 |
| 2012/0164592 | A1 | * | 6/2012 | Maoz | F24D 19/1051 432/29 |
| 2014/0202549 | A1 | * | 7/2014 | Hazzard | F24H 9/2007 137/3 |
| 2016/0069220 | A1 | * | 3/2016 | Wain | F02B 43/08 60/651 |
| 2019/0023554 | A1 | * | 1/2019 | Choi | B67D 3/0022 |

FOREIGN PATENT DOCUMENTS

| | | |
|---|---|---|
| FR | 2579312 | 9/1986 |
| GB | 1575118 | 9/1980 |
| JP | 2004137956 | 5/2004 |

* cited by examiner

PROCESS FOR UNIFORMIZING THE TEMPERATURE OF A LIQUID

CROSS REFERENCE TO RELATED APPLICATION(S)

The present application claims priority to PCT International Application No. PCT/IB2016/053205 filed on Jun. 1, 2016, which application claims priority to Italian Patent Application No. 102015000020004 filed Jun. 3, 2015, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a process for uniformizing the temperature of a liquid having a variable temperature over time.

BACKGROUND ART

Industrial processes are known in which one of the secondary outputs is a fluid, typically at high temperature. In order to exploit the energy stored in the fluid coming from a process, heat exchangers or other devices for energy recovery, in particular for heat absorption and exploitation, are commonly used.

In discontinuous industrial processes, the temperature of the fluid at the outlet is variable over time, typically with high temperature fluctuations, making the energy recovery devices unusable or poorly efficient. In such discontinuous processes the fluid, which can be air, water, molten salts or other, is commonly fed into a storage tank in order to uniformize as much as possible the temperature thereof. The fluid coming from the tank is then conveyed to the energy recovery devices or other utilities. However, the efficiency of such tanks is limited. In fact, while the height of the temperature peaks of the fluid is lowered, the fluctuation of the fluid temperature over time still remains of considerable entity. By such a conventional uniformization process, the fluid can be fed only to complex and/or large utilities.

Moreover, in the traditional uniformization processes, in order to obtain relatively low temperature fluctuations it is necessary to use large tanks. In particular, the higher the temperature fluctuations of the fluid at the inlet of the tank, the greater the tank size; it is also necessary to have a large distance between the inlet and the outlet of the tank, in order not to affect the temperature of the fluid at the outlet.

An example of a discontinuous process is the production of steel by electric arc furnace, where the amount of dissipated heat from outgoing fumes is very large and the high variability of the temperatures and of the flow rates of the fumes, due to the highly intermittent production process, makes the recovery technologies used unable to carry out large energy recoveries. In particular, by observing the trend of the temperature of the water extracted from a heat recovery system, associated to the melting cycle of steel in an electric arc furnace and fed to a storage tank, the high temperature peaks of water are clearly visible. Disadvantageously, however, also the temperature fluctuation of the water coming from the storage tank remains considerable.

Other examples of highly discontinuous processes are the processes associated with the crematoria, the basic oxygen processes BOF and the production of refractories.

A need is therefore felt to provide a process for uniformizing the temperature of a liquid coming from a discontinuous industrial process that is more efficient compared to the prior art processes. A need is also felt for a storage tank for uniformizing the temperature of a liquid, coming from a discontinuous industrial process which is usable with such a process, which is smaller in size compared to known tanks, which does not require expensive insulating coatings and which allows an efficient uniformization of temperature.

SUMMARY OF THE INVENTION

A primary object of the present invention is to provide a process which allows to uniformize, or control, the temperature of a liquid coming, via a conduit, preferably from a discontinuous industrial process, thereby greatly reducing the fluctuations thereof.

An example of a discontinuous process is the production of steel by electric arc furnace, where the amount of dissipated heat from outgoing fumes is very large and, due to the highly intermittent production process, a high variability of the fume temperatures and flow rates occurs.

Other examples of highly discontinuous processes are the processes associated with the crematoria, the basic oxygen processes BOF and the production of refractories.

The systems fed with liquid at uniformized temperature can for example be heating systems or the same cooling systems downstream of the storage tank or even systems for the production of energy: the fluid is controlled in order to reduce the temperature peaks thereof and thus use smaller cooling systems.

Therefore, a process has been implemented for uniformizing the temperature of a liquid coming from a conduit with a constant total flow rate $Q_{tot}$, said temperature having a periodic trend over time defined by a first waveform, in which a tank is provided, defining a longitudinal axis, having a lower zone and an upper zone, and provided with at least two inlets arranged in a succession between the lower zone and the upper zone, with a first inlet proximal to the upper zone and an n-th inlet proximal to the lower zone, and provided with at least one outlet arranged between the first inlet and the upper zone, wherein said at least two inlets are connected to said conduit with a constant total flow rate (Qtot) and wherein each inlet is arranged at a predetermined distance from the next one along said longitudinal axis, said process comprising, according to claim 1, the steps of:

a) decomposing the first waveform in at least two sinusoidal waves, each having a respective semi-period $\Delta t_1$, $\Delta t_2$, $\Delta t_3$ ... $\Delta t_k$, with $\Delta t_1 > \Delta t_2 > \Delta t_3 > ... \Delta t_k$;

b) carrying out a first sum of the first waveform with a second waveform equal to said first waveform and out of phase with respect to the latter by a first semi-period $\Delta t_1$ of a first sinusoidal wave of said at least two sinusoidal waves;

c) if the temperature profile obtained in step b) is constant or variable in time within a predetermined temperature range, providing a tank provided with only two inlets and distributing the total flow rate $Q_{tot}$ between said two inlets so that the respective partial flow rates are equal to $Q_2 = Q_1 = Q_{tot}/2$; otherwise d) carrying out a second sum of a third waveform, obtained from the first sum, with a fourth waveform that is equal to said first waveform and out of phase with respect to the latter by a time $\Delta t_1 + \Delta t_2$, defined by the sum of said first semi-period $\Delta t_1$ and of a second semi-period $\Delta t_2$ of a second sinusoidal wave of said at least two sinusoidal waves;

e) if the temperature profile obtained in step d) is constant or variable in time within said predetermined temperature range, providing a tank provided with only three inlets and distributing the total flow rate $Q_{tot}$ among said three inlets so that the respective partial flow rates are equal to $Q_1=Q_{tot}/2$ and $Q_3=Q_2=Q_{tot}/2^2$; otherwise f) carrying out a third sum of a fifth waveform, obtained from the second sum, with a sixth waveform that is equal to said first waveform and out of phase with respect to the latter by a time $\Delta t_1+\Delta t_2+\Delta t_3$, defined by the sum of said first semi-period $\Delta t_1$, said second semi-period $\Delta t_2$ and a third semi-period $\Delta t_3$ of a third sinusoidal wave of said at least two sinusoidal waves;

g) if the temperature profile obtained in step f) is constant or variable in time within said predetermined temperature range, providing a tank provided with only four inlets and distributing the total flow rate $Q_{tot}$ among said four inlets so that the respective partial flow rates are equal to $Q_1=Q_{tot}/2$, $Q_2=Q_{tot}/2^2$ and $Q_4=Q_3=Q_{tot}/2^3$; otherwise h) continuing up to carrying out an (n−1)-th sum of a p-th waveform with a (p+1)-th waveform that is equal to said first waveform and out of phase with respect to the latter by a time $\Delta t_1+\Delta t_2+\Delta t_3+\ldots \Delta t_k$, where $\Delta t_k$ is a k-th semi-period of a k-th sinusoidal wave of said at least two sinusoidal waves, with k=(p+1)/2; and providing a tank provided with "n" inlets distributing the total flow rate $Q_{tot}$ among said "n" inlets so that the respective partial flow rates are equal to $Q_i=Q_{tot}/2^i$, with i=1, . . . n−1 and with $Q_n=Q_{n-1}=Q_{tot}/2^{(n-1)}$.

Advantageously, the process according to the invention allows to obtain a particularly efficient uniformization of the temperature of the liquid coming from the tank, providing a trend of the liquid temperature over time which is constant or approximately constant over time, i.e. without large fluctuations.

A further advantage of the process according to the invention is that the effect of uniformizing the liquid temperature is achieved in a shorter time compared to the prior art processes.

A further object of the present invention is to provide a storage tank for uniformizing, by the aforesaid process, the temperature of a liquid coming from a conduit with a constant total flow rate $Q_{tot}$, said temperature having a periodic trend over time defined by a first waveform. The tank defines a longitudinal axis, has a lower zone and an upper zone, is provided with at least two inlets arranged in a succession between the lower zone and the upper zone, with a first inlet proximal to the upper zone and an n-th inlet proximal to the lower zone, and is provided with at least one outlet arranged between the first inlet and the upper zone, and wherein each inlet is arranged at a predetermined distance from the next one along said longitudinal axis, wherein the maximum number of inlets is equal to (k+1), where k is the number of sinusoidal waves in which said first waveform is decomposed.

The liquid used in the process of the invention may be water, molten salts, oils or other type of liquid common in this type of systems.

Advantageously, the tank according to the invention allows an efficient uniformization of the temperature of a fluid coming from an outlet conduit of a discontinuous industrial process. Moreover, due to the process efficiency, the tank according to the invention is smaller in size, allowing a more rapid recirculation of liquid at its interior compared to traditional tanks.

In other words, the tank of the invention as a function of thermal energy storage, temperature/energy oscillation damper, acting as a "thermal flywheel", and has a function of expansion vessel.

Therefore, among the advantages provided by the process of the invention are:

obtaining the uniformization of a liquid at variable temperature, bringing it to an engineeringly constant or approximately constant temperature, obtaining an inertial thermal mass for damping the temperature oscillations, possibility of using a smaller tank and having lower implementation costs.

The dependent claims describe preferred embodiments of the invention.

BRIEF DESCRIPTION OF THE FIGURES

Further features and advantages of the invention will appear more clearly from the detailed description of preferred, but not exclusive, embodiments of a process for uniformizing a liquid and a tank for implementing the process, shown by way of a non-limiting example with the aid of the accompanying drawings, in which.

The same reference numerals in the figures identify the same elements or components.

DETAILED DESCRIPTION OF PREFERRED EMBODIMENTS OF THE INVENTION

With reference to the Figures, a process is described which allows to uniformize or control the temperature of a liquid, such as water, coming from a conduit, preferably downstream of a discontinuous industrial process, i.e. a process that allows to make the trend of the temperature of such a liquid at the outlet from a storage tank constant or approximately constant over time. The trend of the temperature of the liquid coming from the discontinuous industrial process is instead a periodic trend which has several high temperature peaks.

Figure 1:
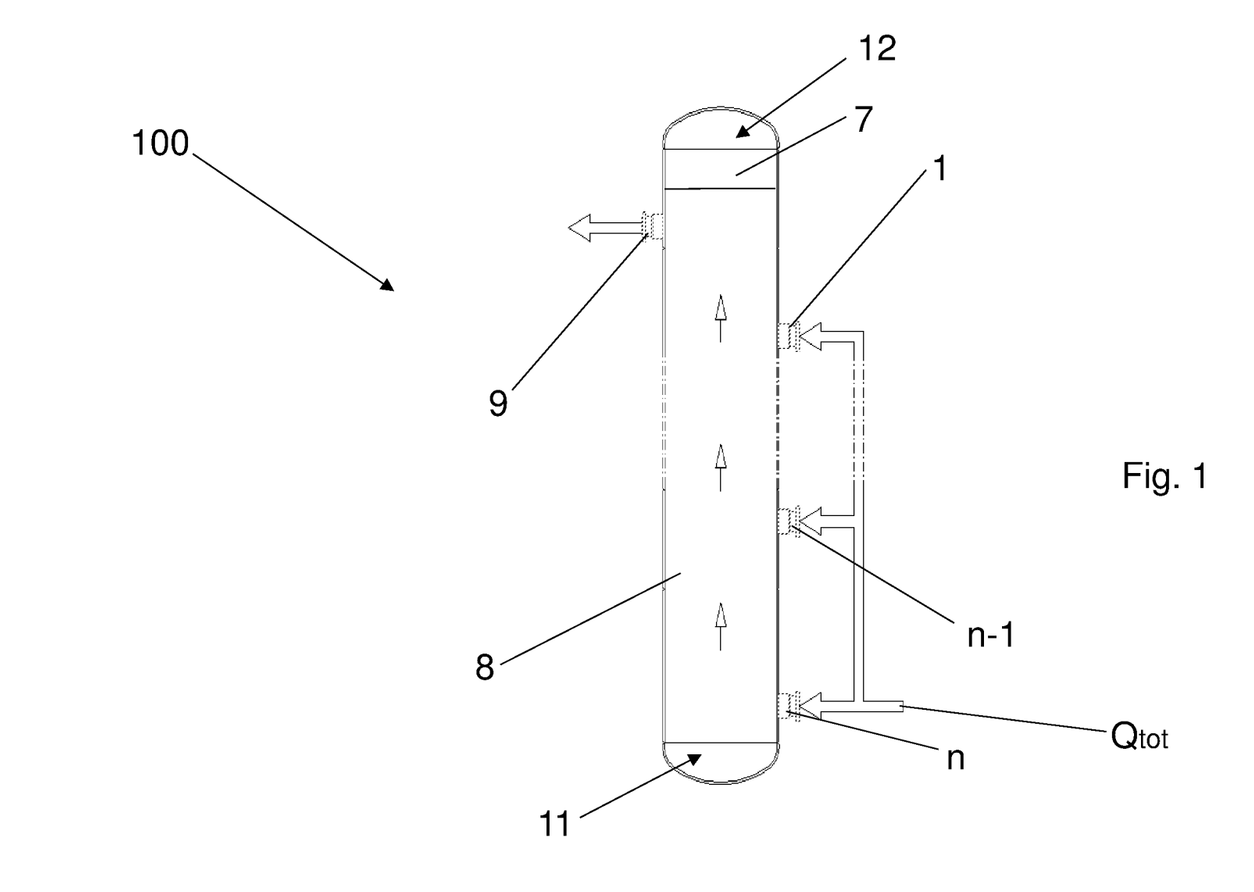
FIG. 1 shows a generic tank according to the invention.

The process according to the invention includes a tank 100 having an upper zone 12 and a lower zone 11. Tank 100 is provided with at least two inlets 1, 2 and one outlet 9.

In a tank with "n" inlets, with n≥2, inlets 1, . . . i, . . . n are arranged in succession at different heights between the lower zone 11 and the upper zone 12. Each inlet 1, . . . i, . . . n, defines a level. By convention, the inlets are indicated with reference numerals increasing in a direction from the upper zone 12 towards the lower zone 11, so that the inlet proximal to the upper zone 12 is indicated with reference numeral I and the inlet proximal to the lower zone 11 is indicated with reference numeral "n". By convention, letter "i" indicates a generic inlet i placed between inlet I and inlet n. By convention, inlet n–1 is the inlet immediately above inlet n; inlet n–2 is the inlet immediately above inlet n–1, and so on. Outlet 9 is placed between inlet 1 and the upper zone 12.

Through inlets 1, . . . i, . . . n, the liquid downstream of the discontinuous industrial process is fed to tank 100, and through outlet 9, the liquid is fed to a utility, such as a heat exchanger. The number "n" of inlets corresponds to "n" liquid flows entering into tank 100. In particular, the liquid enters into tank 100 at the same time through the n inlets. The idea underlying the present invention is that of mixing the n liquid flows entering into tank 100 at the different levels, with a temperature trend that is out of phase in time. Preferably, the discontinuous temperature flows entering at n different levels are mixed in phase opposition.

Tank 100, substantially cylindrical, has a predetermined area A of the transverse section taken along a plane orthogonal to the longitudinal axis of the tank. In a preferred variant, tank 100, defining a longitudinal axis, has a cylindrical central stretch with a predetermined diameter "d" and area A of its transverse section, while the lower zone 11 and the upper zone 12 have, for example, a spherical cap shape.

By the invention process it is possible to determine the number of tank inlets required to satisfactorily uniformize the temperature of the liquid coming from a discontinuous industrial process, and the flow rate of liquid introduced into the tank by means of every single inlet.

The process of the invention also allows to determine the distance between one inlet and the immediately following inlet.

In the process of the invention, a step is provided in which the periodic trend of the temperature of the liquid entering into tank 100 is analyzed and decomposed into at least two sinusoidal waves by applying the Fourier theorem, which states that any periodic signal can be decomposed into the sum of a possible constant term and of sinusoidal signals, of which the first signal, having the same period, and then the same frequency of the periodic signal considered, is called first harmonic or fundamental, and the other signals, having submultiple periods and therefore multiple frequencies, are called higher harmonics.

A wave representative of the periodic trend of the liquid temperature, downstream of a discontinuous industrial process, which is fed to tank 100, can in fact be decomposed to a sum of sinusoidal waves, also referred to as basic waves, each having a respective semi-period $\Delta t_1, \Delta t_2, \Delta t_3, \ldots \Delta t_k$, where preferably $\Delta t_1 > \Delta t_2 > \Delta t_3, \ldots > \Delta t_k$.

According to the invention, considering a constant total flow rate $Q_{tot}$, downstream of a discontinuous industrial process and in input to tank 100 of the invention, such a total flow rate $Q_{tot}$ is distributed among inlets 1, . . . i, . . . n into partial flow rates, through adjustment valves arranged along the inlet lines to tank 100, according to the following relations:

$Q_i = Q_{tot}/2^i$, with the exception of flow rate $Q_n$ that is equal to flow rate $Q_{n-1} = Q_{tot}/2^{(n-1)}$ where:

$Q_n$ is the partial flow rate of inlet n proximal to the lower zone 11;

$Q_{n-1}$ is the partial flow rate of inlet n–1 which is immediately above inlet n; and $Q_i$ is the partial flow rate of each of the remaining inlets i.

This distribution allows to obtain the weighted mean of temperatures at each inlet.

Each partial flow rate is used to calculate the rising speed $v_i$ of the liquid into tank 100 towards the upper zone 12, starting from the i-th inlet. The following relations are used:

$$v_i = \frac{\sum_{k=i}^{n} Q_k}{A}$$

where $v_i$=rising speed starting from the i-th inlet.

Therefore, the distance between one inlet and the next one along the longitudinal axis of the tank is determined according to:

the semi-periods $\Delta t_1, \Delta t_2, \ldots \Delta t_k$ of the sinusoidal waves in which the periodic trend of the liquid temperature at the tank inlet has been decomposed, speeds $v_1$.

In this context, semi-period of a wave is the time interval between a trough and the next wave crest, in particular between the minimum temperature and the subsequent maximum temperature of each wave.

The distance between each inlet and the next one is calculated by the relations:

$$h_{n-1} = v_n \cdot \Delta t_1; h_{n-2} = (v_{n-1}) \cdot \Delta t_2; \text{ and so on,}$$

where $h_{n-1}$=distance between inlet n and inlet n–1

$h_{n-2}$=distance between inlet n–1 and inlet n–2, and so on, and where:

$\Delta t_1, \Delta t_2, \Delta t_3 \ldots \Delta t_k$ are the semi-periods of the waves in which the periodic trend of the liquid temperature in input to the tank has been decomposed, wherein preferably $\Delta t_1 > \Delta t_2 > \Delta t_3 \ldots \Delta t_k$.

Preferably, the sinusoidal wave having the greatest semi-period $\Delta t_1$ is also the sinusoidal wave having the greater difference $\Delta t$ between the maximum temperature and the minimum temperature, compared to the other sinusoidal waves in which the periodic waveform representing the trend of the temperature of the liquid coming from the industrial process has been decomposed.

According to the process of the invention, the liquid enters into tank 100 through the "n" inlets at the time instant $t_0$, with a certain trend of its temperature over time. Using the above distributions of the total flow rate $Q_{tot}$ and calculating the distances h between the inlets, there is provided a tank in which a mixing of the liquid at different levels is obtained, starting from the lower zone 11, with a temperature trend that is out of phase in time. In particular, according to the invention, at the time instant "$t_0 + \Delta t_1$" a liquid at low or high temperature which had entered at the time instant to reaches the height of the immediately next inlet and at the time instant "$t_0 + \Delta t_1$" the liquid at high or low temperature enters. In this way, exploiting the time difference of the flows that are mixed into tank 100, a damping of the temperature trend is advantageously obtained, up to reaching a trend of the temperature of the liquid coming from tank 100 which is constant or almost constant over time, within a predetermined range of temperature.

Preferably, tank 100 is provided with a first inner zone 8 for recirculating the liquid in liquid phase and a second inner zone 7 to adequately contain the gas produced by the liquid phase. In this way, tank 100 is provided with an expansion vessel to manage the pressure at its interior, in the presence of liquids at variable temperature.

Advantageously, it is not necessary that outlet 9 is placed at a specific distance from each inlet 1, ... i, ... n, in particular from the first inlet 1.

It is noted that, in this context, an inlet and/or outlet may be a conduit, a nozzle, a diffuser or other means known to a man skilled in the art.

Moreover, while area A in the examples provided is substantially constant throughout tank 100, at least along the cylindrical central stretch, a tank having variable area A does not fall outside the scope of the present invention.

According to an alternative embodiment, each level of the tank may be provided with two or more inlets and/or a plurality of outlets.

Alternatively, each level of the tank may be provided with a suitable liquid distribution system, through lateral wall portions of the tank.

According to another variant of the invention, a single inlet and a plurality of outlets may be provided; for example, the outlet liquid may be obtained by withdrawing from one or the other outlet of the tank depending on the temperature of the liquid at the inlet. Suitable withdrawal logics allow to obtain the desired final liquid (such as at a constant temperature).

According to a further embodiment, it is provided that the tank may be provided with a plurality of inlets and a plurality of outlets.

The process of the invention, which is managed by a suitable software, is hereinafter described in detail and some exemplary embodiments are described thereafter by way of non-limiting example.

Considering a liquid coming from a conduit with a constant total flow rate $Q_{tot}$, with a temperature having a periodic trend in time defined by a first waveform, the process for uniformizing the temperature object of the invention comprises the following steps:

a) decomposing said first waveform in at least two sinusoidal waves, by applying the Fourier theorem, each having a respective semi-period $\Delta t_1$, $\Delta t_2$, $\Delta t_3$ ... $\Delta t_k$, with $\Delta t_1 > \Delta t_2 > \Delta t_3 > ... \Delta t_k$;

b) carrying out a first sum of the first waveform with a second waveform equal to said first waveform and out of phase with respect to the latter by a first semi-period $\Delta t_1$ of a first sinusoidal wave;

c) if the temperature profile obtained in step b) is constant or variable in time within a predetermined temperature range, providing a tank provided with only two inlets 1, 2 (FIG. 7) and distributing the total flow rate $Q_{tot}$ between said two inlets so that the respective partial flow rates $Q_1$, $Q_2$ are equal to $Q_2=Q_1=Q_{tot}/2$; otherwise d) carrying out a second sum of a third waveform, obtained from the first sum, with a fourth waveform that is equal to said first waveform and out of phase with respect to the latter by a time $\Delta t_1+\Delta t_2$, defined by the sum of said first semi-period $\Delta t_1$ and of a second semi-period $\Delta t_2$ of a second sinusoidal wave;

e) if the temperature profile obtained in step d) is constant or variable in time within said predetermined temperature range, providing a tank provided with only three inlets 1, 2, 3 (FIG. 2) and distributing the total flow rate $Q_{tot}$ between said three inlets so that the respective partial flow rates $Q_1$, $Q_2$, $Q_3$ are equal to $Q_1=Q_{tot}/2$ and $Q_3=Q_2=Q_{tot}/2^2$; otherwise f) carrying out a third sum of a fifth waveform, obtained from the second sum, with a sixth waveform that is equal to said first waveform and out of phase with respect to the latter by a time $\Delta t_1+\Delta t_2+\Delta t_3$, defined by the sum of said first semi-period $\Delta t_1$, said second semi-period $\Delta t_2$ and a third semi-period $\Delta t_3$ of a third sinusoidal wave;

g) if the temperature profile obtained in step f) is constant or variable in time within said predetermined temperature range, providing a tank provided with only four inlets 1, 2, 3, 4 (n=4) and distributing the total flow rate $Q_{tot}$ among said four inlets so that the respective partial flow rates $Q_1$, $Q_2$, $Q_3$, $Q_4$ are equal to $Q_1=Q_{tot}/2$, $Q_2=Q_{tot}/2^2$ and $Q_4=Q_3=Q_{tot}/2^3$; otherwise h) continuing up to carrying out an n-th sum of a p-th waveform obtained from an (n−1)-th sum, with a (p+1)-th waveform that is equal to said first waveform and out of phase with respect to the latter by a time $\Delta t_1+\Delta t_2+\Delta t_3+ ... \Delta t_k$, where $\Delta t_k$ is a k-th semi-period of a k-th sinusoidal wave of said at least two sinusoidal waves, with k=(p+1)/2; and providing a tank provided with "n" inlets distributing the total flow rate $Q_{tot}$ among said "n" inlets so that the respective partial flow rates are equal to $Q_i=Q_{tot}/2^i$, with i=1, ... n−1 and with $Q_n=Q_{n-1}=Q_{tot}/2^{(n-1)}$.

In a first case in which, by applying the Fourier theorem, the first waveform is decomposed into a sum of two sinusoidal waves, each having a respective semi-period $\Delta t_1$, $\Delta t_2$, with $\Delta t_1 > \Delta t_2$, the process will stop at step c) if the temperature of the liquid, obtained by a first mixing between a liquid represented by the first waveform and a liquid represented by the second waveform, equal to the first waveform and out of phase with respect to the latter by the semi-period $\Delta t_1$, is constant or variable in time within a predetermined temperature range, such as 20° C. wide or less. Otherwise, the process will continue with steps d) and e) which will lead, through a second mixing between a liquid represented by the third waveform, obtained from the first mixing, and a liquid represented by the fourth waveform, equal to the first waveform and out of phase with respect to the latter by a time $\Delta t_1+\Delta t_2$, to a further control of the temperature inside the tank.

Therefore, in this first case, the number of inlets of tank 100 will be equal to two if the desired temperature condition of the liquid at the outlet is reached after only one mixing. Otherwise, the number of inlets of tank 100 will be equal to three and the temperature of the liquid at the outlet will be further lowered through the aforesaid second mixing.

If, by applying the Fourier theorem, the first waveform is decomposed into a sum of three sinusoidal waves, each having a respective semi-period $\Delta t_1$, $\Delta t_2$, $\Delta t_3$ with $\Delta t_1 > \Delta t_2 > \Delta t_3$, the process will stop at step c) if the temperature of the liquid, obtained by the first mixing between a liquid represented by the first waveform and a liquid represented by the second waveform, equal to the first waveform and out of phase with respect to the latter by the semi-period $\Delta t_1$, is constant or variable in time within a predetermined temperature range, such as 20° C. wide or less. Otherwise, the process will continue with steps d) and e) which will lead, through the second mixing between a liquid represented by the third waveform, obtained from the first mixing, and a liquid represented by the fourth waveform, equal to the first waveform and out of phase with respect to the latter by a time $\Delta t_1+\Delta t_2$, to a further control of the temperature inside the tank. The process will stop at step e) if the liquid temperature obtained by the second mixing is constant or variable in time within said predetermined temperature range. Otherwise, the process will continue with steps f) and g) which will lead, through a third mixing between a liquid represented by the fifth waveform, obtained from the second mixing, and a liquid represented by the sixth waveform, equal to the first waveform and out of phase with respect to the latter by a time $\Delta t_1+\Delta t_2+\Delta t_3$, to a further control of the temperature inside the tank.

Therefore, in this second case, the number of inlets of tank 100 will be:
- equal to two if the desired temperature condition of the liquid at the outlet is reached after only one mixing;
- or equal to three if the desired temperature condition of the liquid at the outlet is reached after the second mixing;
- or equal to four, with the liquid temperature at the outlet further lowered by the third mixing.

Generalizing, therefore, if by applying the Fourier theorem the first waveform is decomposed into a sum of "k" sinusoidal waves, in the design step the number "n" of inlets of tank 100 is selected from a minimum value equal to two and a maximum value equal to (k+1).

Example 1

With reference to FIGS. 2 to 6, let's consider a trend in time of the temperature of a liquid downstream of a discontinuous industrial process represented by waveform 30 (FIG. 3), in which the maximum difference $\Delta T_0$ found between the maximum temperature and the minimum temperature is equal to 46.87° C. The constant total flow rate is equal to $Q_{tot}$=450 m³/h and the use a storage tank 100 having a diameter of 3 meters is provided. The predetermined temperature range within which the temperature variation from the tank is acceptable is for example equal to 20° C.

Figure 3:
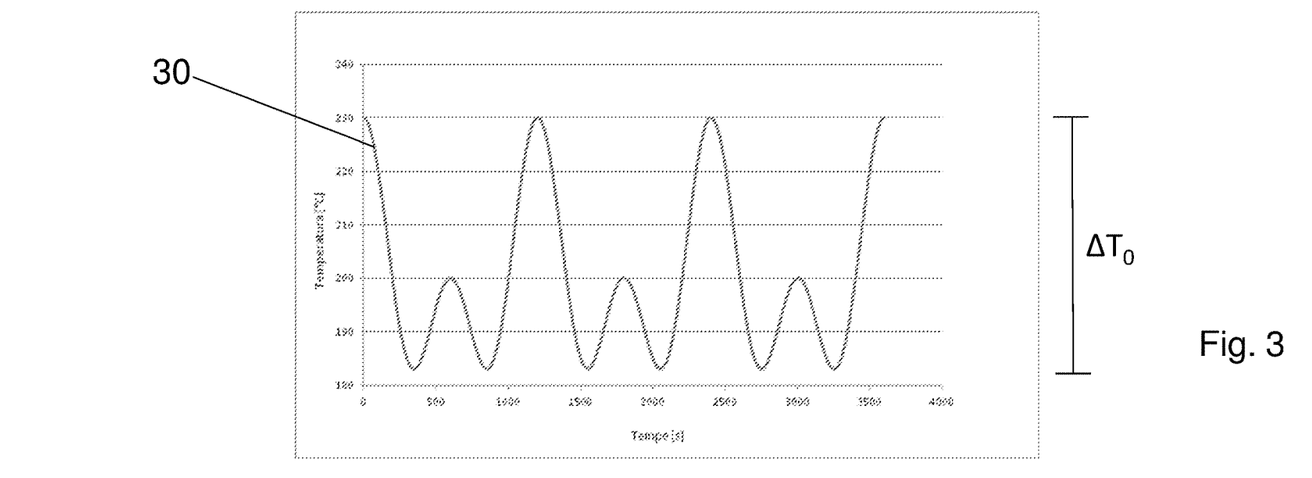
FIG. 3 shows the trend of the temperature of a liquid at the inlet into the tank in FIG. 2.
Figure 4:
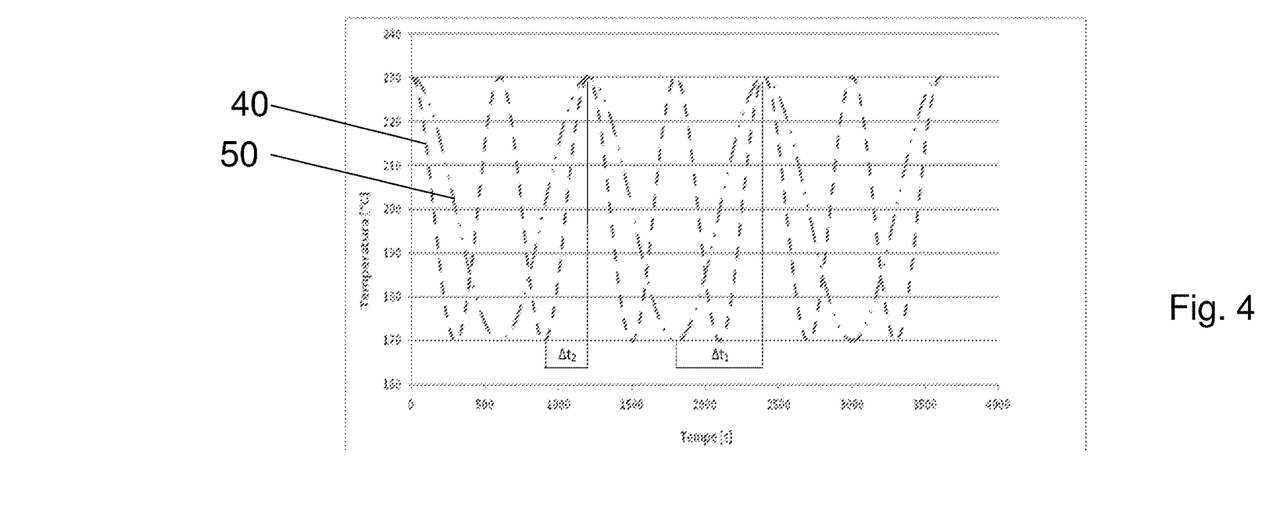
FIG. 4 shows two basic waves of the trend of temperature in FIG. 3.

The trend in time of the temperature in FIG. 3 is decomposed, by applying the Fourier theorem, into the sum of two sinusoidal waves or basic waves 40, 50 (FIG. 4), each having a semi-period $\Delta t_1$=10 min and $\Delta t_2$=5 min, respectively.

Figure 5:
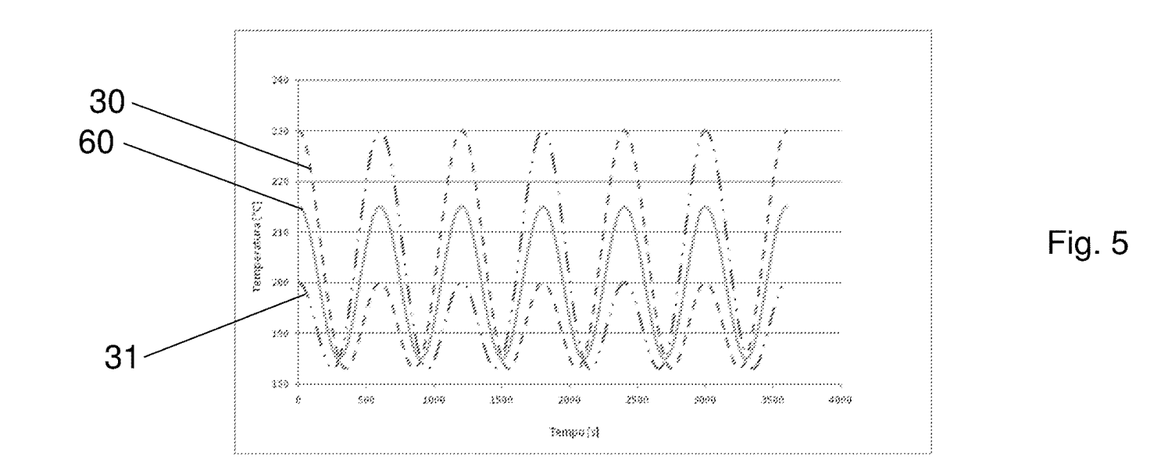
FIG. 5 shows a first mixing according to the process of the invention.

The sum between waveform 30 and waveform 31 equal to waveform 30 and out of phase with respect to the latter by a time equal to semi-period $\Delta t_1$ of the sinusoidal wave 50 is carried out (FIG. 5). The result of this sum is a waveform 60 (FIG. 5) the profile of which is sinusoidal, with the maximum difference $\Delta t_1$ found between the maximum temperature and the minimum temperature reduced to about 30° C.

Figure 6:
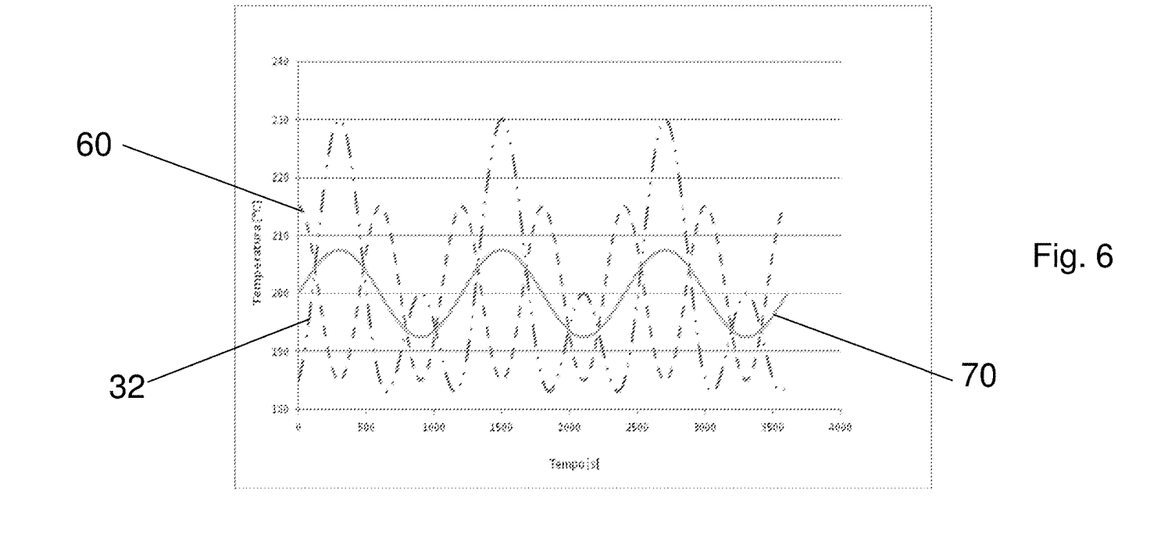
FIG. 6 shows a second mixing according to the process of the invention.

Since difference $\Delta t_1$ is greater than 20° C., the sum between waveform 60 and waveform 32 equal to waveform 30 and out of phase with respect to the latter by a time $\Delta t_1 + \Delta t_2$, defined by the sum of semi-period $\Delta t_1$ of the sinusoidal wave 50 and of semi-period $\Delta t_2$ of the sinusoidal wave 40 is carried out (FIG. 6). The result of this sum is a waveform 70 (FIG. 6) the profile of which is sinusoidal, with the maximum difference $\Delta T_2$ found between the maximum temperature and the minimum temperature further reduced to about 15° C., obtaining a trend in time in which the average value of the liquid temperature is equal to 200° C.

Therefore, in order to better control the temperature of the liquid coming from the industrial process, tank 100 is made with three inlets 1, 2, 3 (FIG. 2) and the total flow rate ($Q_{tot}$) is distributed into the three inlets so that the respective partial flow rates $Q_1$, $Q_2$, $Q_3$ are equal to $Q_1=Q_{tot}/2$ and $Q_3=Q_2=Q_{tot}/2^2$.

Figure 2:
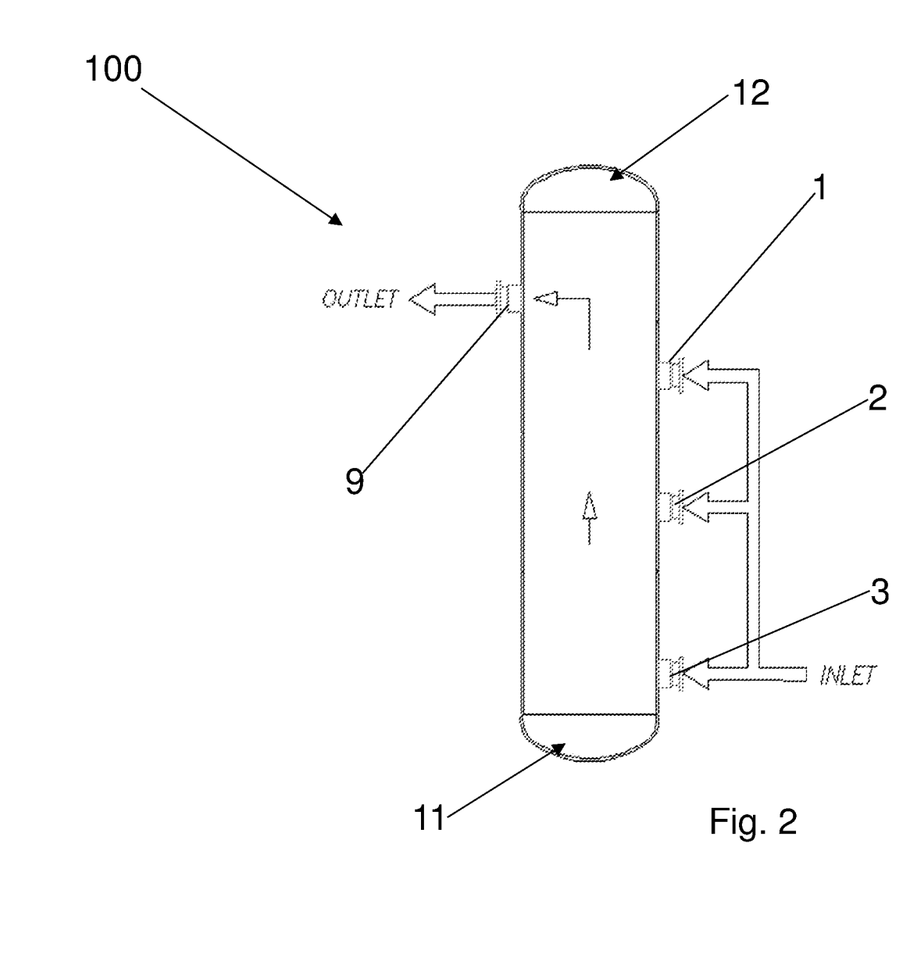
FIG. 2 shows a first tank according to the invention.

The partial flow rate entering into each inlet and the distances between one inlet and the next one are determined according to the relations described above:

$Q_1=Q_{tot}/2=225$ m³/h $Q_3=Q_2=(Q_{tot})/2=112.5$ m³/h $v_3=Q_3/(\pi d^2/4)=4.42 \cdot 10^{-3}$ m/s $v_2=(Q_2+Q_3)/(\pi d^2/4)=8.84 \cdot 10^{-3}$ m/s $h_2=v_3 \cdot \Delta t_1=2.65$ m (distance between inlet 3 and inlet 2)

$h_1=v_2 \cdot \Delta t_2=2.65$ m (distance between inlet 2 and inlet 1).

A first mixing takes place at the height of inlet 2, where the temperature wave downstream of the discontinuous industrial process temperature, waveform 30, and waveform 31, which is equal and out of phase by $\Delta t_1$ with respect to waveform 30, are averaged. Due to the first mixing, the trend in time of the temperature is a sinusoidal wave, represented by waveform 60, in which difference $\Delta T_1$ is reduced to about 30° C. When the liquid reaches the height of inlet 1, a second mixing occurs between the wave represented by waveform 60 and waveform 32, which is equal and out of phase by $\Delta t_1 + \Delta t_2$ with respect to waveform 30. Due to the second mixing, difference $\Delta T_2$ is further reduced to about 15° C., obtaining an average value of the liquid temperature equal to 200° C.

Example 2

With reference to FIGS. 7 to 10, let's consider a trend in time of the temperature of the liquid downstream of a discontinuous industrial process represented by waveform 35 (FIG. 8), in which the maximum difference $\Delta t_0$ found between the maximum temperature and the minimum temperature is equal to about 45° C. The constant total flow rate is equal to $Q_{tot}$=450 m³/h and the use a storage tank 100 having a diameter of 3 meters is provided. The predetermined temperature range within which the temperature variation from the tank is acceptable is for example equal to 20° C.

Figure 8:
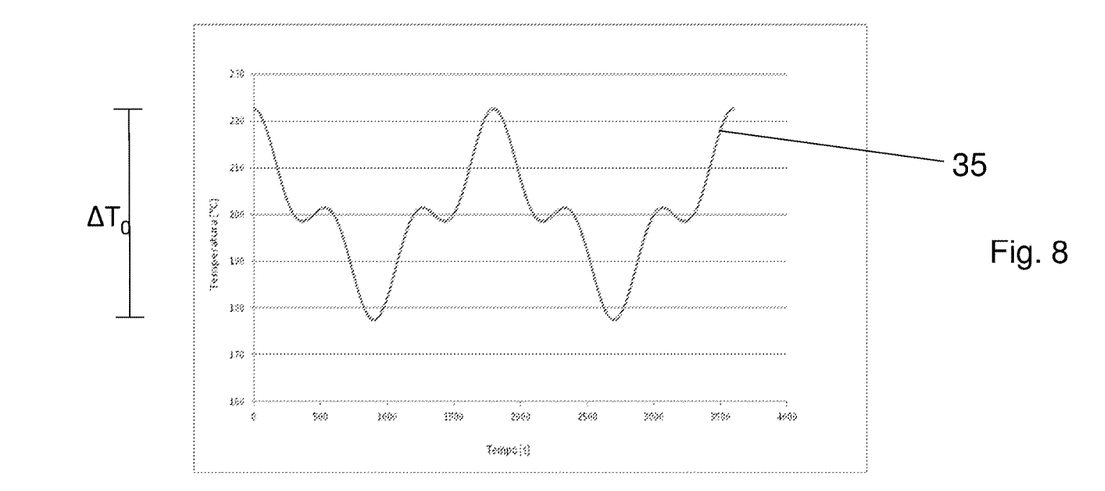
FIG. 8 shows the trend of the temperature of a liquid at the inlet into the tank in FIG. 7.
Figure 9:
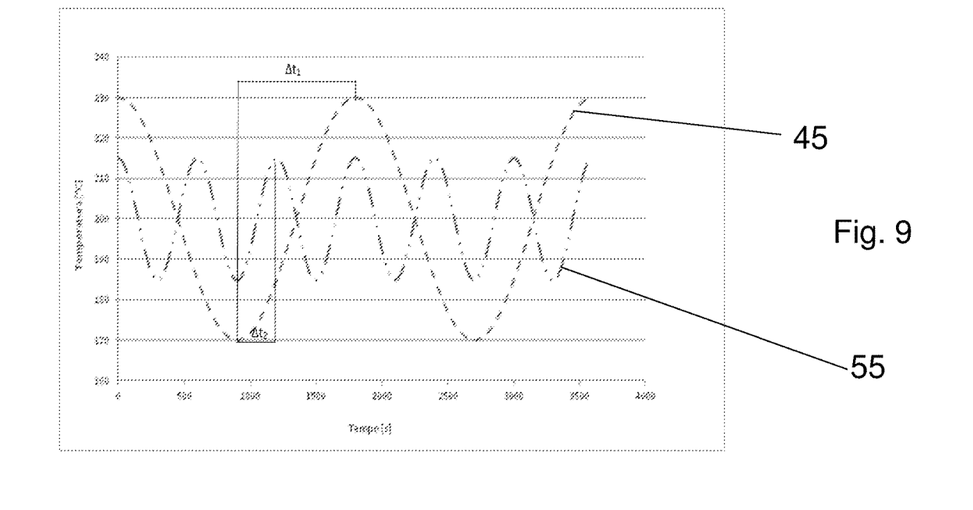
FIG. 9 shows two basic waves of the trend of temperature in FIG. 8.

The trend in time of the temperature in FIG. 8 is decomposed, by applying the Fourier theorem, into the sum of two sinusoidal waves or basic waves 45, 55 (FIG. 9), each having a semi-period $\Delta t_1$=15 min and $\Delta t_2$=5 min, respectively.

Figure 10:
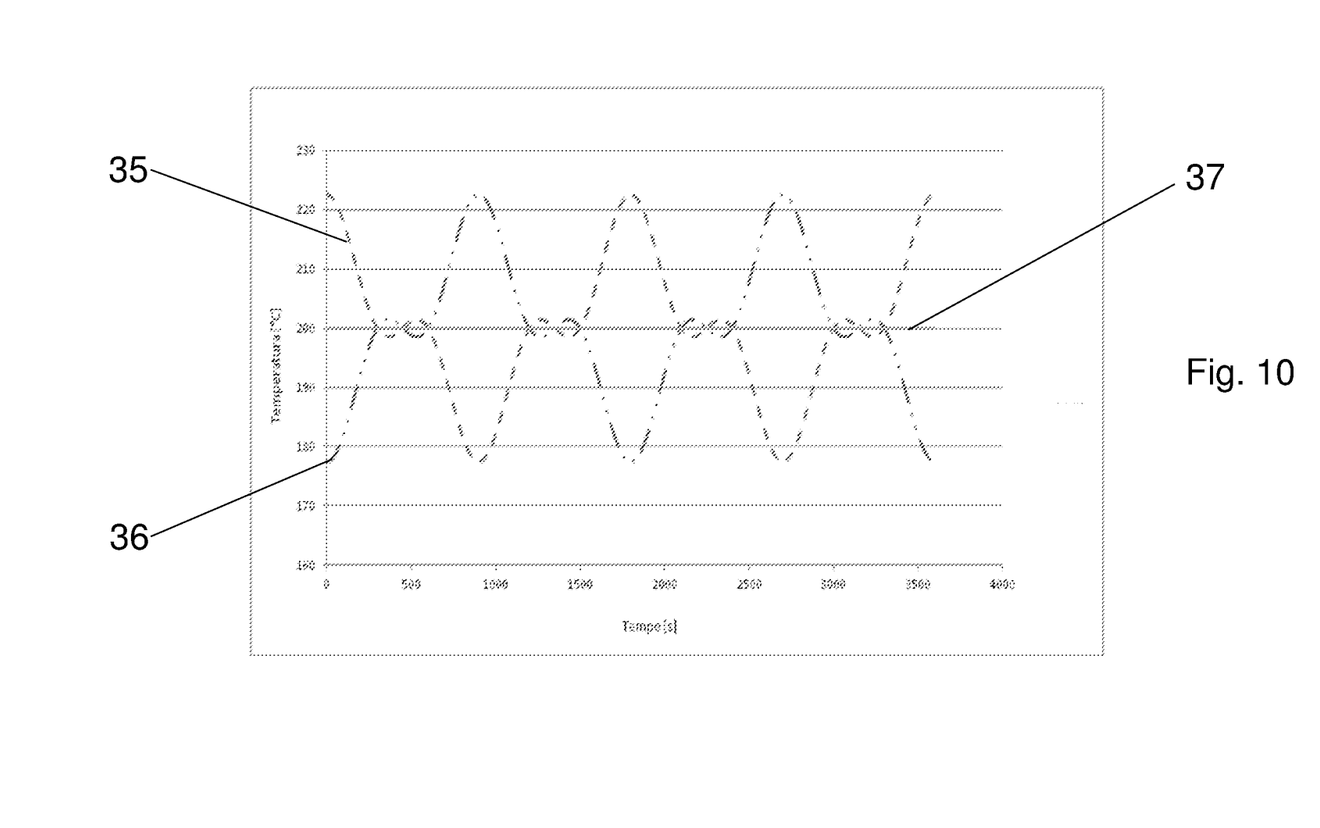
FIG. 10 shows a mixing according to the process of the invention.

The sum between waveform 35 and waveform 36 equal to waveform 35 and out of phase with respect to the latter by a time equal to semi-period $\Delta t_1$ of the sinusoidal wave 45 is carried out (FIG. 10). The result of this sum is a waveform 37 (FIG. 10), the profile of which is flat, i.e. at a constant temperature of 200° C. Since the temperature is constant after this mixing alone, in order to better control the temperature of the liquid coming from the industrial process, tank 100 is made with two inlets 1, 2 (FIG. 7) and the total flow rate ($Q_{tot}$) is distributed between the two inlets so that the respective partial flow rates $Q_1$, $Q_2$ are equal to $Q_1=Q_2=Q_{tot}/2$.

Figure 7:
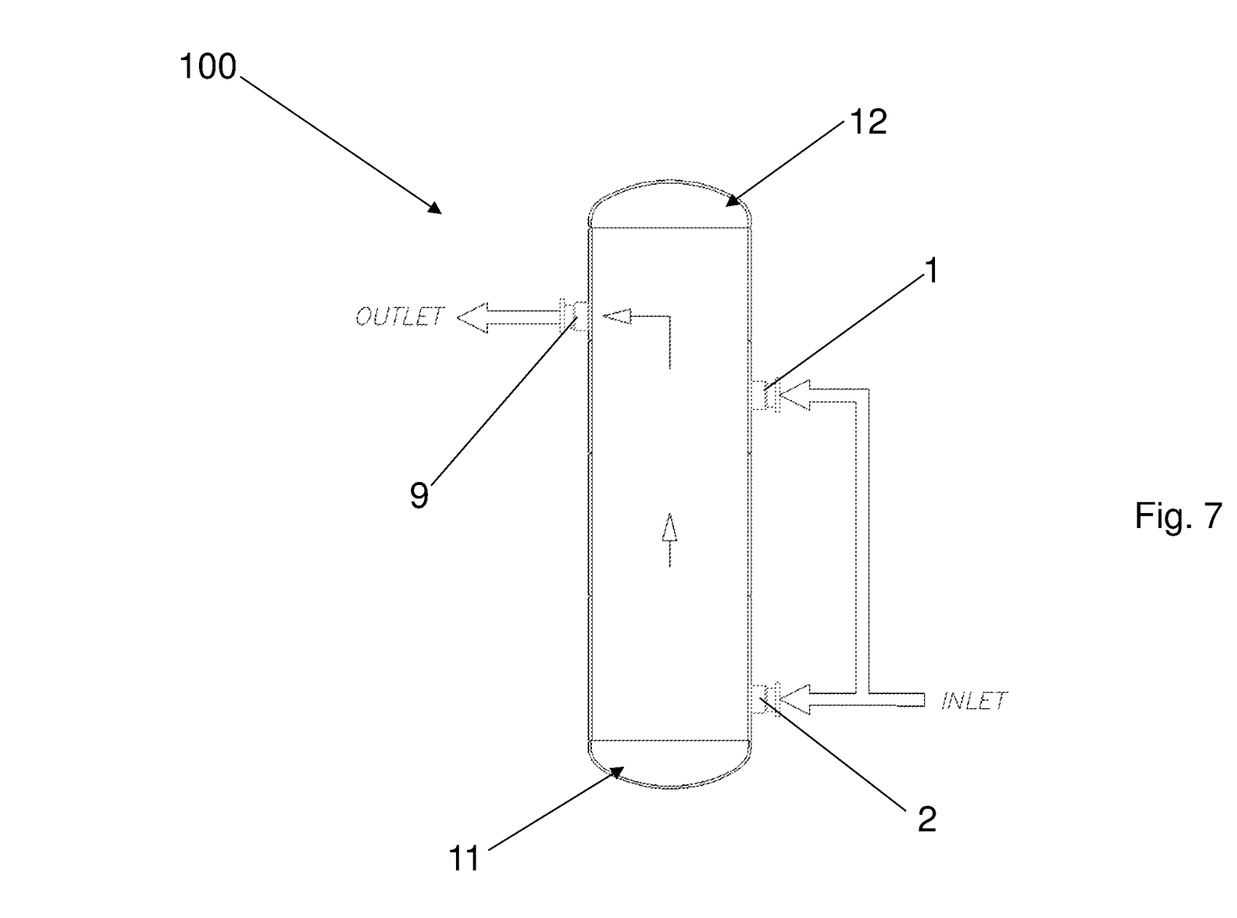
FIG. 7 shows a second tank according to the invention.

The partial flow rate entering into each inlet and the distances between one inlet and the next one are determined according to the relations described above:

$Q_2=Q_1=Q_{tot}/2=225$ m³/h $v_2=Q_2/(\pi d^2/4)=8.84 \cdot 10^{-3}$ m/s $h_1=v_2 \cdot \Delta t_1=7.96$ m (distance between inlet 2 and inlet 1).

The only mixing takes place at the height of inlet 1, where the temperature wave downstream of the discontinuous industrial process temperature, waveform 35, and waveform 36, which is equal and out of phase by $\Delta t_1$ with respect to waveform 35, are averaged. Due to this mixing, the trend over time of the temperature at the outlet from tank 100 is constant. In particular, the trend over time of the temperature of the liquid entering through inlets 1 and 2 at the time instant $t_0$ is represented by wave 35. At the time instant $t_0+\Delta t_1$, at the height of inlet 1, the mixing takes place between wave 35 and wave 36, which is equal and out of phase by $t_0+\Delta t_1$ with respect to wave 35. In this way, a mixing occurs at the height of inlet 1, thus obtaining a temperature of the liquid coming from the tank equal to 200° C.

The invention claimed is:

1. A process for uniformizing the temperature of a liquid coming from a conduit with a constant total flow rate $Q_{tot}$, said temperature having a periodic trend over time defined by a first waveform,
wherein there is provided a tank defining a longitudinal axis, having a lower zone and an upper zone, provided with at least two inlets arranged in a succession between the lower zone and the upper zone, with a first inlet proximal to the upper zone and an n-th inlet proximal to the lower zone, and provided with at least one outlet (9) arranged between the first inlet and the upper zone, wherein said at least two inlets are connected to said conduit with a constant total flow rate Qtot and wherein each inlet is arranged at a predetermined distance from the next one along said longitudinal axis,
said process comprising the steps of:
a) decomposing the first waveform in at least two sinusoidal waves, each having a respective semi-period $\Delta t_1$, $\Delta t_2$, $\Delta t_3$ ... $\Delta t_k$, with $\Delta t_1 > \Delta t_2 > \Delta t_3 > ... \Delta t_k$);
b) carrying out a first sum of the first waveform with a second waveform equal to said first waveform and out of phase with respect to the latter by a first semi-period $\Delta t_1$ of a first sinusoidal wave of said at least two sinusoidal waves;
c) if a temperature profile obtained in step b) is constant or variable in time within a predetermined temperature range, providing a tank provided with only two inlets and distributing the total flow rate $Q_{tot}$ between said two inlets so that the respective partial flow rates $Q_1$, $Q_2$ are equal to $Q_2=Q_1=Q_{tot}/2$; otherwise
d) carrying out a second sum of a third waveform, obtained from the first sum, with a fourth waveform that is equal to said first waveform and out of phase with respect to the latter by a time $\Delta t_1+\Delta t_2$, defined by the sum of said first semi-period $\Delta t_1$ and of a second semi-period $\Delta t_2$ of a second sinusoidal wave of said at least two sinusoidal waves;
e) if the temperature profile obtained in step d) is constant or variable in time within said predetermined temperature range, providing a tank provided with only three inlets and distributing the total flow rate $Q_{tot}$ among said three inlets so that the respective partial flow rates $Q_1$, $Q_2$, $Q_3$ are equal to $Q_1=Q_{tot}/2$ and $Q_3=Q_2=Q_{tot}/2^2$; otherwise
f) carrying out a third sum of a fifth waveform, obtained from the second sum, with a sixth waveform that is equal to said first waveform and out of phase with respect to the latter by a time $\Delta t_1+\Delta t_2+\Delta t_3$, defined by the sum of said first semi-period $\Delta t_1$, said second semi-period $\Delta t_2$ and a third semi-period $\Delta t_3$ of a third sinusoidal wave of said at least two sinusoidal waves;
g) if the temperature profile obtained in step f) is constant or variable in time within said predetermined temperature range, providing a tank provided with only four inlets and distributing the total flow rate $Q_{tot}$ among said four inlets so that the respective partial flow rates $Q_1$, $Q_2$, $Q_3$, $Q_4$ are equal to $Q_1=Q_{tot}/2$, $Q_2=Q_{tot}/2^2$ and $Q_4=Q_3=Q_{tot}/2^3$; otherwise h) continuing up to carrying out an (n−1)-th sum of a p-th waveform with a (p+1)-th waveform that is equal to said first waveform and out of phase with respect to the latter by a time $\Delta t_1+\Delta t_2+\Delta t_3+ ... \Delta t_k$, where $\Delta t_k$ is a k-th semi-period of a k-th sinusoidal wave of said at least two sinusoidal waves, with k=(p+1)/2; and providing a tank provided with "n" inlets distributing the total flow rate $Q_{tot}$ among said "n" inlets so that the respective partial flow rates are equal to $Q_i=Q_{tot}/2^i$, with i=1, ... n−1 and with $Q_n=Q_{n-1}=Q_{tot}/2^{(n-1)}$.

2. A process according to claim 1, wherein if the first waveform is decomposed into a sum of two sinusoidal waves, each having a respective semi-period $\Delta t_1$, $\Delta t_2$, with $\Delta t_1 > \Delta t_2$, the process stops at step c) or at step e).

3. A process according to claim 1, wherein if the first waveform is decomposed into a sum of three sinusoidal waves, each having a respective semi-period $\Delta t_1$, $\Delta t_2$, $\Delta t_3$ with $\Delta t_1 > \Delta t_2 > \Delta t_3$, the process stops at step c) or at step e) or at step g).

4. A process according to claim 1, wherein a maximum number of inlets is equal to (k+1), where k is the number of sinusoidal waves in which the first waveform is decomposed.

5. A process according to claim 1, wherein the tank is substantially cylindrical and has a transverse section, along a plane orthogonal to the longitudinal axis thereof, having a predetermined area A, and the rising speed $v_1, ..., v_i, ... v_n$ of the liquid inside the tank, towards the upper zone, is defined by the relations:

$$v_i = \frac{\sum_{k=i}^{n} Q_k}{A}$$

where $v_i$=rising speed starting from the i-th inlet.

6. A process according to claim 4, wherein each inlet i=1, ... m is arranged at a predetermined distance from the next one, the distance between each inlet being defined by the relations:

$$h_{n-1}=v_n \cdot \Delta t_1; h_{n-2}=v_{n-1} \cdot \Delta t_2 \text{ and so on,}$$

where:
$h_{n-1}$=distance between the n-th inlet (n) and the next inlet (n−1),
$h_{n-2}$=distance between said next inlet (n−1) and a further next inlet (n−2).

7. A storage tank for uniformizing, by means of a process according to claim 1, a temperature of a liquid coming from a conduit with a constant total flow rate Qtot, said temperature having a periodic trend over time defined by a first waveform, the tank defining a longitudinal axis, having a lower zone and an upper zone, and provided with at least two inlets arranged in a succession between the lower zone and the upper zone, with a first inlet proximal to the upper zone and an n-th inlet proximal to the lower zone, and provided with, at least one outlet arranged between the first inlet and the upper zone, and wherein each inlet is arranged at a predetermined distance from the next one along said longitudinal axis,
wherein the maximum number of inlets is equal to (k+1), where k is the number of sinusoidal waves in which said first waveform is decomposed.

* * * * *